United States Patent Office 2,773,197
Patented Dec. 4, 1956

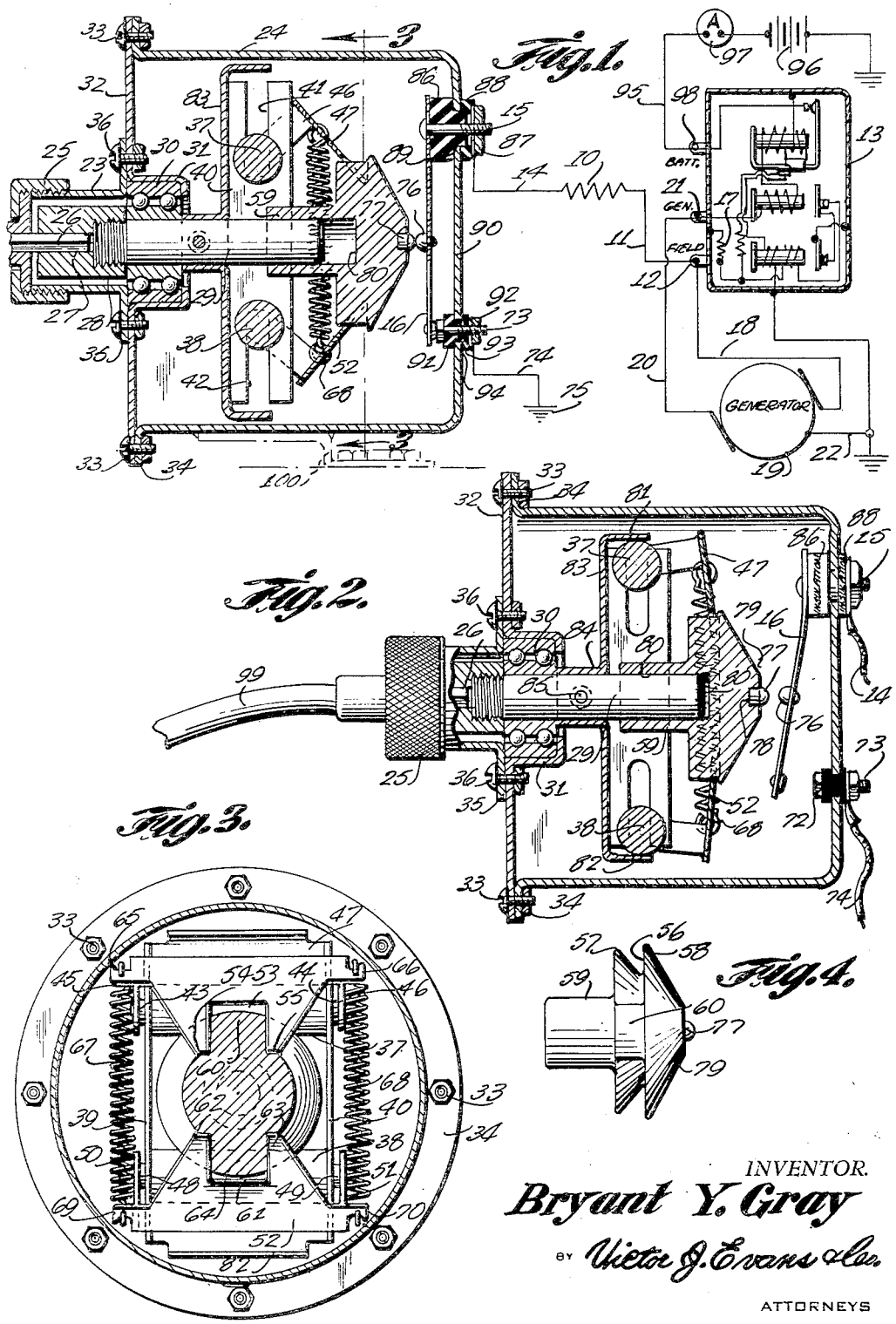

2,773,197
AUXILIARY GENERATOR CHARGING RATE CONTROL

Bryant Y. Gray, Houston, Tex.

Application October 25, 1954, Serial No. 464,486

4 Claims. (Cl. 290—50)

This invention relates to ignition systems of motor vehicles and particularly conventional generator regulators which control the amount of charge transmitted to a battery of a vehicle by the generator thereof, and in particular, this invention includes an auxiliary resistor which when grounded and connected in parallel with the resistor of the conventional generator regulator decreases the total resistance between the field coil of the generator and ground, wherein a greater amount of current is provided in the field coil of the generator with the vehicle traveling at low speeds and wherein means is provided for connecting the auxiliary resistor in the generator circuit when the vehicle is traveling at low speeds.

The purpose of this invention is to increase the charging rate of a generator of a motor vehicle in cold weather, particularly with the vehicle traveling at low speed, to compensate for increased battery loads resulting from increased energy required for cranking the engine of a vehicle, from the longer time required for use of the lights and from the continued use of the vehicle for shorter runs.

In very low temperatures, the capacity of a storage battery of a motor vehicle is considerably reduced and the energy required for cranking the engine is increased. Furthermore, frequent starting, particularly in cold weather, accompanied by short runs and use of the lights for long periods of time due to shorter days, makes a higher state of charge necessary. With this thought in mind, this invention contemplates means for providing a higher average rate of charge in the battery of a motor vehicle with the vehicle traveling at low speeds and a governor for cutting out the charge increasing means with the vehicle traveling at high speeds.

The object of this invention is, therefore, to provide an automatically operating regulating device adapted to be used in combination with the conventional generator regulator of a motor vehicle whereby a higher rate of charge is provided in the battery of the vehicle with the vehicle traveling at low speeds.

Another object of the invention is to provide means for increasing the charging rate of a generator of a motor vehicle with the vehicle traveling at low speed in which the amount of increase is adapted to be regulated.

A further object of the invention is to provide means for automatically increasing the charging rate of a generator of a motor vehicle with the vehicle traveling at low speeds in which the device is of a simple and economical construction.

With these and other objects and advantages in view, the invention embodies a resistor which, when grounded and connected in parallel with the conventional resistor in a generator regulator circuit, provides a total resistance that is less than that of a conventional resistor of a generator regulator incorporated in a circuit of a motor vehicle generator and a governor for actuating a switch whereby the generator circuit to the auxiliary resistor is completed with the vehicle in which the device is installed operating at low speeds and in which the circuit is automatically broken with the vehicle traveling at high speeds.

Other features and advantages of the invention will appear from the following description, taken in connection with the drawing, wherein:

Figure 1 is a view showing, diagrammatically, a conventional generator regulator with the auxiliary resistor of this invention positioned in a circuit connecting the regulator to a governor actuated switch, the governor and switch being shown in section and the switch being shown in the closed position.

Figure 2 is a section through the governor and switch, similar to that shown in Figure 1, with the switch in the open position.

Figure 3 is a cross section through the governor being taken on line 3—3 of Figure 1.

Figure 4 is a view showing a side elevation of a floating switch actuating member of the governor.

Referring now to the drawing, wherein like reference characters denote corresponding parts, the improved device for increasing the charging rate of a generator of a motor vehicle includes an electrical resistor 10 connected by a wire 11 to the field terminal 12 of a conventional generator regulator 13, the opposite side of the resistor being connected with a wire 14 to a terminal 15 of a switch having a contact bar 16 whereby with the switch in the closed position, such as with the vehicle operating at low speeds and with the current carrying capacity of the auxiliary resistor 10 combined with that of resistor 17 of the generator regulator, a greater amount of current is provided in the field coil of the generator and the charging rate of the generator is increased.

The terminal 12 of the conventional generator regulator is connected by a wire 18 to one side of a generator 19, such as the generator of a vehicle, and the opposite side of the generator is connected by a wire 20 to generator terminal 21 of the regulator. The generator is provided with a ground connection, as indicated by the numeral 22.

The governor for actuating the switch, and particularly the contact arm 16, is driven by a section of the conventional speedometer cable of a vehicle in which the device is installed, the flexible housing of which is connected to a sleeve 23 of governor housing 24 with a coupling 25 and the speedometer cable, as indicated by the numeral 26, extends into a splined socket 27 of a bushing 28 in which a governor shaft 29 is threaded. The shaft 29 is rotatably mounted in the housing with a bearing 30 positioned in a hub 31 on the inner side of an end plate 32 that is secured by bolts 33 to a flange 34 on the open end of the housing 24. The sleeve 23 is provided with an annular flange 35 that is secured to the end wall 32 with bolts 36.

The governor includes weights 37 and 38 positioned between side plates 39 and 40 and, as illustrated in Figure 1, the weight 37 is slidably mounted in slots 41 in the side plates and the weight 38 in similar slots 42. The weight 37 is provided with pins 43 and 44 that extend through the slots and the ends of the pins are secured in arms 45 and 46 that extend from a plate 47. The weight 38 is provided with similar pins 48 and 49 and the ends of the pins are secured in arms 50 and 51 extended from a plate 52.

The plate 47 is provided with a notch 53 forming arms 54 and 55 which extend into a recess 56 between conical shaped discs 57 and 58 of a floating member having a hub 59, straddling a lug 60 positioned in the area between the members 57 and 58; and the plate 52 is provided with a similar recess, as indicated by the numeral 61, providing arms 62 and 63 that straddle a lug 64 also in the recess 56 and positioned on the opposite side of the floating member.

The plate 47 is also provided with hook-like extensions 65 and 66 upon which end coils of springs 67 and 68 are positioned and the opposite ends of the springs are retained on similar projections 69 and 70 extended from the plate 52. By this means, the plates 47 and 52 are resiliently retained in the annular recess 56 and with the vehicle traveling at comparatively high speed the rollers or weights 37 and 38 are forced outwardly by centrifugal force, to the positions illustrated in Figure 2, wherein the plates 47 and 52 draw the floating member from the position shown in Figure 1 to that shown in Figure 2 whereby the contact arm 16 of the switch is released and spring inherent in the arm draws a contact 71 away from a contact 72 of a terminal 73 which is connected by a wire 74 to a ground, as indicated by the numeral 75. The contact arm 16 is provided with a button 76 that is positioned to be engaged by a similar button 77 in a socket 78 of end 79 of the floating member and the floating member is provided with a bore 80 that extends through the hub 59 thereof whereby the floating member is freely slidable on the end of the shaft 29.

Outward movement of the weights 37 and 38 is limited by flanges 81 and 82 extended from a plate 83 and the plate is mounted by a hub 84 on the shaft 29, the hub being secured to the shaft with a bolt 85. The side plates 39 and 40 in which the slots 41 and 42 are positioned also extend from the edges of the plate 83. The flanges 81 and 82 limit outward movement of the weights or rollers 37 and 38, it being only necessary for the weights to travel outwardly a sufficient distance to separate the members 76 and 77.

The terminal 15 is mounted with an insulating bushing 86 that is secured by a nut 87 and a washer 88 in an opening 89 in end wall 90 of the housing 24, and the terminal 73 is provided with a similar bushing 91 that is secured by a nut 92 and a washer 93 in an opening 94 in the end wall 90.

The conventional generator regulator 13 is connected by a wire 95 to a battery 96 of the vehicle and a charge indicator 97 is provided in the wire. The wire 95 is connected to a terminal 98 of the generator regulator and it will be understood that these and other parts of the generator regulator are conventional.

As illustrated in Figure 2, the governor is connected to a flexible housing 99 of a section of a speedometer cable with the coupling member 25 and the governor housing 24 may be provided with a suitable bracket, as indicated by the numeral 100, whereby it may be mounted on a part of a vehicle.

Since the charging rate of a generator is controlled by the amount of current in the field coil of the generator, the auxiliary resistor 10 when grounded and connected in parallel with the resistor 17 of the conventional generator regulator by the contacts 15, 16 and 73 decreases the total resistance between the field coil of the generator and the ground whereby the amount of current supplied to the field coil is increased and the charging rate of the generator increased accordingly.

When the speed of the vehicle reaches a predetermined amount, the floating member of the governor moves away from the contact arm 16 breaking the circuit to the auxiliary resistor 10 whereby the generator regulator functions in the conventional manner.

It will be understood that modifications, within the scope of the appended claims, may be made in the design and arrangement of the parts without departing from the spirit of the invention.

What is claimed is:

1. A charging rate control comprising a generator having a field winding, a generator regulator including a conventional resistance, a speedometer cable, an auxiliary resistor connected in parallel with said conventional resistance whereby the amount of current in the field winding of the generator is increased with the vehicle traveling at low speed, and a governor including a housing, a shaft rotatably mounted in the housing, a floating member slidably mounted on the shaft, spaced plates with slots therein carried by the shaft, weights positioned to travel in the slots of the plates, means operatively connecting the weights to the floating member, and a switch positioned to be engaged by said floating member, said shaft being actuated by the speedometer cable of the vehicle and said switch cutting out the auxiliary resistor as the speed of the vehicle reaches a predetermined amount.

2. In a charging rate control, the combination which comprises a generator having a field terminal and a field winding, a conventional generator regulator, a speedometer cable an auxiliary resistor, a circuit having a switch therein and in which the auxiliary resistor is positioned connecting the field terminal of the conventional generator regulator of the vehicle to a ground, and a governor adapted to be attached to a portion of the speedometer cable of the vehicle, said governor being positioned to retain the switch in the circuit of the auxiliary resistor closed with the vehicle traveling at low speed and being adapted to open said switch with the vehicle traveling at high speed.

3. In a charging rate control, the combination which comprises a generator having a field winding and a field terminal, a conventional generator regulator, a speedometer cable an auxiliary resistor, a circuit having a switch therein and in which the auxiliary resistor is positioned connecting the field terminal of the conventional generator regulator of the vehicle to a ground, a governor adapted to be attached to a portion of the speedometer cable of the vehicle, said governor being positioned to retain the switch in the circuit of the auxiliary resistor closed with the vehicle traveling at low speed and being adapted to open said switch with the vehicle traveling at high speed, said governor having a floating member for holding the switch in the closed position and said floating member being actuated by weights to release the contact arm of the switch.

4. A charging rate control for use in a vehicle, a battery in the vehicle, a speedometer cable in the vehicle, a generator having field windings also positioned in the vehicle, a voltage regulator having resistances and also having a shunt winding and a series winding, a wire connecting the series winding of the voltage regulator to the field windings of the generator, a low impedance resistance, a switch having spaced terminals, a wire connecting the low impedance resistance to the wire connecting the series winding of the voltage regulator to the field windings of the generator, said generator also having an armature, means connecting the armature of the generator to a ground, a wire connecting the low impedance resistance to one terminal of the switch, a second terminal of the switch being grounded, a contact bar mounted on the terminal of the switch to which the wire of the low impedance resistance is connected and positioned to contact the second terminal of the switch said contact bar being retained in spaced relation to said second terminal of the switch by resiliency inherent therein, a governor shaft positioned in alignment with a point midway between the terminals of the switch, spaced side plates having slots therein mounted on the governor shaft and positioned on opposite sides thereof, a floating member having spaced transversely disposed conical-shaped discs thereon mounted to slide longitudinally on the governor shaft, weights slidably mounted in the slots of the side plates and having arms positioned to straddle lugs between the discs, said weights being extended across opposite sides of the governor shaft, and springs positioned on opposite sides of the governor shaft and connected to said arms for retracting the weights as the speed of the vehicle is reduced, said floating member being adapted to retain the contact bar in engagement with the second terminal of the switch when the vehicle is stationary or traveling at low speed.

References Cited in the file of this patent

UNITED STATES PATENTS

| 1,114,759 | Heyroth | Oct. 27, 1914 |
| 1,219,519 | Wilson | Mar. 20, 1917 |
| 2,151,373 | Claytor | Mar. 21, 1939 |
| 2,558,644 | Claytor | June 26, 1951 |